(12) United States Patent
Pudipeddi et al.

(10) Patent No.: US 9,454,542 B2
(45) Date of Patent: *Sep. 27, 2016

(54) EXTENSIBLE FILE SYSTEM

(75) Inventors: Ravisankar V. Pudipeddi, Bellevue, WA (US); Vishal V. Ghotge, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 182 days.

This patent is subject to a terminal disclaimer.

(21) Appl. No.: 12/052,594

(22) Filed: Mar. 20, 2008

(65) Prior Publication Data

US 2008/0215646 A1 Sep. 4, 2008

Related U.S. Application Data

(62) Division of application No. 11/229,485, filed on Sep. 16, 2005.

(60) Provisional application No. 60/637,407, filed on Dec. 17, 2004.

(51) Int. Cl.
*G06F 17/30* (2006.01)

(52) U.S. Cl.
CPC ..... *G06F 17/30179* (2013.01); *G06F 17/3012* (2013.01)

(58) Field of Classification Search
USPC .......... 707/801, 804, 999.204, 999.205, 204, 707/205, 999.001, E17.01; 714/2; 711/111
See application file for complete search history.

(56) References Cited

U.S. PATENT DOCUMENTS

| | | | |
|---|---|---|---|
| 4,780,821 A | 10/1988 | Crossley |
| 4,987,531 A | 1/1991 | Nishikado |
| 5,083,264 A | 1/1992 | Platteter |
| 5,202,982 A | 4/1993 | Gramlich et al. |
| 5,307,494 A | 4/1994 | Yasumatsu |
| 5,313,646 A | 5/1994 | Hendricks |
| 5,359,725 A | 10/1994 | Garcia |
| 5,363,487 A | 11/1994 | Willman |
| 5,367,671 A | 11/1994 | Feigenbaum |
| 5,371,885 A | 12/1994 | Letwin |
| 5,388,257 A | 2/1995 | Bauer |
| 5,392,427 A | 2/1995 | Barrett |
| 5,412,808 A | 5/1995 | Bauer |

(Continued)

FOREIGN PATENT DOCUMENTS

| AU | 2005229678 B2 | 11/2010 |
|---|---|---|
| CN | 1477518 A | 2/2004 |

(Continued)

OTHER PUBLICATIONS

"Above Software Introduces 'Golden Retriever 2.0b'," News Release, Dateline: Irvine, California, Mar. 29, 1993.

(Continued)

*Primary Examiner* — Ann J Lo
(74) *Attorney, Agent, or Firm* — Sunah Lee; Dan Choi; Micky Minhas

(57) ABSTRACT

An extensible file system format for portable storage media is provided. The extensible file system format includes the specification of primary and secondary directory entry types that may be custom defined. The primary and secondary directory entry types can be further classified as critical and benign directory entries.

15 Claims, 6 Drawing Sheets

(56) References Cited

U.S. PATENT DOCUMENTS

| | | |
|---|---|---|
| 5,421,001 A | 5/1995 | Methe |
| 5,434,974 A | 7/1995 | Loucks |
| 5,437,029 A | 7/1995 | Sinha |
| 5,483,652 A | 1/1996 | Sudama |
| 5,535,375 A | 7/1996 | Eshel |
| 5,579,517 A | 11/1996 | Reynolds |
| 5,596,755 A | 1/1997 | Pletcher |
| 5,627,996 A | 5/1997 | Bauer |
| 5,694,606 A | 12/1997 | Pletcher |
| 5,745,752 A | 4/1998 | Hurvig |
| 5,745,902 A | 4/1998 | Miller |
| 5,754,848 A | 5/1998 | Hanes |
| 5,758,352 A | 5/1998 | Reynolds |
| 5,761,675 A | 6/1998 | Isenberg |
| 5,761,677 A | 6/1998 | Senator |
| 5,765,169 A | 6/1998 | Conner |
| 5,819,275 A | 10/1998 | Badger |
| 5,898,868 A | 4/1999 | Krueger |
| 5,923,884 A | 7/1999 | Peyret et al. |
| 5,926,805 A | 7/1999 | Hurvig |
| 5,930,828 A | 7/1999 | Jensen et al. |
| 6,023,744 A | 2/2000 | Shoroff et al. |
| 6,055,527 A | 4/2000 | Badger |
| 6,081,804 A | 6/2000 | Smith |
| 6,144,969 A | 11/2000 | Inokuchi et al. |
| 6,205,558 B1 | 3/2001 | Sobel |
| 6,253,300 B1 | 6/2001 | Lawrence et al. |
| 6,374,265 B1 | 4/2002 | Chen |
| 6,612,490 B1 | 9/2003 | Herrendoerfer et al. |
| 6,615,365 B1 | 9/2003 | Jenevein et al. |
| 6,654,772 B1 | 11/2003 | Crow et al. |
| 7,032,107 B2 | 4/2006 | Stutton et al. |
| 7,072,917 B2 | 7/2006 | Wong et al. |
| 7,274,857 B2 | 9/2007 | Nallur et al. |
| 7,380,140 B1 | 5/2008 | Weissman et al. |
| 7,380,157 B2 | 5/2008 | Brewer et al. |
| 7,383,288 B2 | 6/2008 | Miloushev et al. |
| 7,493,445 B2 | 2/2009 | Harada |
| 7,620,620 B1 | 11/2009 | Sedlar |
| 7,676,491 B2 | 3/2010 | Jansen et al. |
| 7,747,664 B2 | 6/2010 | Patel et al. |
| 7,757,100 B2 | 7/2010 | Weissman et al. |
| 7,873,596 B2 | 1/2011 | Pudipeddi et al. |
| 7,941,435 B2 | 5/2011 | Kao et al. |
| 7,979,409 B2 | 7/2011 | Kime |
| 8,321,439 B2 | 11/2012 | Pudipeddi et al. |
| 8,364,732 B2 | 1/2013 | Pudipeddi et al. |
| 8,433,677 B2 | 4/2013 | Pudipeddi et al. |
| 8,452,729 B2 | 5/2013 | Pudipeddi et al. |
| 8,583,708 B2 | 11/2013 | Pudipeddi et al. |
| 8,606,830 B2 | 12/2013 | Pudipeddi et al. |
| 8,725,772 B2 | 5/2014 | Pudipeddi et al. |
| 2002/0042796 A1 | 4/2002 | Igakura |
| 2002/0062301 A1 | 5/2002 | Rudoff |
| 2003/0088587 A1 | 5/2003 | Merrells et al. |
| 2003/0135650 A1 | 7/2003 | Kano et al. |
| 2003/0177107 A1 | 9/2003 | Brown et al. |
| 2003/0182330 A1 | 9/2003 | Manley et al. |
| 2003/0221095 A1 | 11/2003 | Gaunt et al. |
| 2004/0064483 A1 | 4/2004 | Bulka et al. |
| 2004/0215600 A1 | 10/2004 | Aridor |
| 2005/0015354 A1 | 1/2005 | Grubbs et al. |
| 2005/0172005 A1 | 8/2005 | Goodwin |
| 2005/0256838 A1 | 11/2005 | Lasser |
| 2006/0095649 A1 | 5/2006 | Netter et al. |
| 2006/0136529 A1 | 6/2006 | Pudipeddi et al. |
| 2006/0224578 A1 | 10/2006 | Kadatch et al. |
| 2008/0091702 A1 | 4/2008 | Pudipeddi et al. |
| 2008/0168029 A1 | 7/2008 | Pudipeddi et al. |
| 2008/0172426 A1 | 7/2008 | Patel et al. |
| 2008/0215646 A1 | 9/2008 | Pudipeddi et al. |
| 2008/0215647 A1 | 9/2008 | Pudipeddi et al. |
| 2009/0164440 A1 | 6/2009 | Pudipeddi et al. |
| 2009/0164539 A1 | 6/2009 | Pudipeddi et al. |
| 2009/0265400 A1 | 10/2009 | Pudipeddi et al. |

FOREIGN PATENT DOCUMENTS

| | | |
|---|---|---|
| EP | 0462587 A2 | 12/1991 |
| EP | 0618540 A2 | 10/1994 |
| EP | 1376405 A2 | 1/2004 |
| EP | 1677214 | 7/2006 |
| JP | 64-041039 A | 2/1989 |
| JP | 01-315843 A | 12/1989 |
| JP | 02-148341 A | 6/1990 |
| JP | 03-017753 A | 1/1991 |
| JP | 04-188239 A | 7/1992 |
| JP | 60-19763 A | 1/1994 |
| JP | H06-103140 A | 4/1994 |
| JP | 07-234879 | 9/1995 |
| JP | 2001-160068 | 6/2001 |
| JP | 2001-325134 | 11/2001 |
| JP | 2002-099454 A | 4/2002 |
| JP | 2002-132566 A | 5/2002 |
| JP | 2003-162709 | 6/2003 |
| JP | 2003-345708 | 12/2003 |
| JP | 2004-288007 | 10/2004 |
| RU | 2159467 | 11/2000 |
| TW | 533377 B | 5/2003 |
| WO | 01/11486 A2 | 2/2001 |

OTHER PUBLICATIONS

Bonner, P., "What's in a Name?" PC/Computing 2(9):169(2), Sep. 1989.

Bonner, P., "Build a Document Manager Under Windows," PC/Computing 4(12):275(7), Dec. 1991.

Duncan, R., "Design Goals and Implementation of the New High Performance File System," Microsoft Systems Journal 4(5):1-13, Sep. 1989.

Duncan, R., "Power Programming Using Long Filenames and Extended Attributes, Part I," PC Magazine 9(8):317-322, Apr. 24, 1990.

Duncan, R., "Power Programming Using Long Filenames and Extended Attributes, Part II," PC Magazine 9(9):305-310, May 15, 1990.

"File Sharing Protocol," Microsoft Corporation, Nov. 7, 1988.

Glass, B., "Create Your Own Environment," PC-Computing 3(10):106-110, Oct. 1990.

Hurwicz, M., "MS-DOS 3.1 Makes It Easy to Use IBM PCs on a Network," Data Communications, Nov. 1985, pp. 223-237.

"The Intelligent Way to Search," News Release, Dateline: Burlington, Massachusetts, Oct. 1987.

Leffler, S.J., et al., "The Design and Implementation of the 4.3BSD UNIX Operating System," Addison-Wesley Publishing Company, New York, 1989, Chap. 2, "Design Overview of 4.3BSD," pp. 34-36.

"Long Filenames," Article 15, pp. 19-47, date unknown.

Mallory, J., "Breakthrough on DOS Filename Limits," Newsbytes News Network, Apr. 12, 1993, <http://calbears.findarticles.com/p/articles/mi_m0NEW/is_1993_April_12/ai_13786607/print> [retrieved May 24, 2006].

McCormick, J., "Presentation Manager Under OS/2 Encourages Lengthy Name-Calling," Government Computer News 9(10):16, 18, May 14, 1990.

Lent, A.F., and S. Miastkowski, "New, Improved Windows," PC World 11(12):252(17), Dec. 1993.

O'Malley, C., "Fetching Desktop Files: Standalone Document Managers," Windows Sources 1(2):443-444, Mar. 1993.

Rohan, R., "Golden Retriever Fetches Files in Windows," Computer Shopper 12(11):947, Nov. 1992.

Tanenbaum, A.S. (ed.), Minix Operating System, Keiichiro Sakamoto, Tokyo, Japan, 1989, Chap. 5, "File System," pp. 310-313 (English translation of Japanese publication).

Trivette, D.B., "Utility Provides 60-Character Filenames," PC Magazine 7(16):56, Sep. 27, 1988.

Wang, Y.E.G., "Universal_File_Names for Ada," Ada Letters 10(1):111-117, Jan./Feb. 1990.

"World Software Corporation (WSC) Launches Extend-a-name in Europe," Computer Product Update, Jul. 27, 1990.

(56) References Cited

OTHER PUBLICATIONS

Tanenbaum, A.S., "Modern Operating Systems," 2nd ed., Prentice Hall, Englewood Cliffs, NJ, 2001, pp. 442-445, 830-841.
Karpovich, John F. et al.; "ExtensibLe File Systems (ELFS): An Object-Oriented Approach to High Performance File I/O"; 1994; pp. 191-204.
"Long Filenames"; Windows 95 Beta 2 Release SDK; Article 15; Oct. 28, 1994; pp. 19-47.
Russian Office Action issued Dec. 14, 2009 citing Russian reference RU2159467. The relevance of the Office Action is that it was cited by the Russian Patent Office in a Russian counterpart to the instant application.
Khalidi et al., "Extensible File System in Spring" Sun Microsystems Laboratories, Inc., Sep. 1993, 1-18.
U.S. Appl. No. 12/052,584, Non-Final Office Action dated Jun. 14, 2010, 18 pages.
U.S. Appl. No. 12/052,584, Final Office Action dated Jan. 20, 2011, 19 pages.
U.S. Appl. No. 12/052,584, Non-Final Office Action dated Aug. 17, 2011, 10 pages.
U.S. Appl. No. 12/052,584, Non-Final Office Action dated Feb. 29, 2012, 11 pages.
Takenori Yamamori, "Guide to Rise Higher than a Novice, PC UNIX Deciphered from Boot Files," Software Design, No. 131, pp. 110-121, Gijutsu-Hyohron Co., Ltd., Japan, Sep. 18, 2001.
Hiroo Shirasaki, "Observe the Boot Process of FreeBSD 14," UNIX Magazine, vol. 20, No. 2, pp. 91-99, ASCII Corporation, Japan, Feb. 1, 2005.
Japanese Patent Application No. 2012-040595: English translation of the Notice of Rejection dated Mar. 26, 2013, 2 pages.
Japanese Patent Application No. 2013-000671: English translation of the Office Action dated Oct. 15, 2013, 2 pages.
U.S. Appl. No. 12/052,584: Final office action dated Nov. 19, 2012, 10 pages.
U.S. Appl. No. 12/052,584: Notice of Allowance dated Jul. 9, 2013, 6 pages.
"Notice of Allowance Received in European Patent Application No. 05111554.1", Mailed Date: Mar. 14, 2014, Filed Date: Dec. 1, 2005, 5 Pages.
"Office Action Received in India Patent Application No. 3021/DEL/2005", Mailed Date: Dec. 19, 2013, Filed Date: Nov. 10, 2005, 1 Page.
"Office Action Received in Taiwan Patent Application No. 94139703", Mailed Date: Nov. 6, 2013, Filed Date: Nov. 11, 2005, 4 Pages.
"Office Action Received in Israel Patent Application No. 172014", Mailed Date: Oct. 15, 2013, Filed Date: Nov. 17, 2005, 7 Pages.
"Notice of Allowance Received in Mexico Patent Application No. MX/a/2010/012831", Mailed Date: Sep. 9, 2013, Filed Date: Nov. 17, 2005, 2 Pages.
"Notice of Allowance Received in Japan Patent Application No. 2012-040595", Mailed Date: Oct. 1, 2013, Filed Date: Dec. 16, 2005, 3 Pages. (W/O English Translation).
"Office Action and Search Report Received in China Patent Application No. 201210063035.0", Mailed Date: Jan. 26, 2014, Filed Date: Nov. 17, 2005, 11 Pages.
"Notice of Allowance Received in Japan Patent Application No. 2013-000671", Mailed Date: Feb. 4, 2014, Filed Date: Dec. 16, 2005 , 3 Pages. (W/O English Translation).
"Office Action and Search Report Received in Norway Patent Application No. 20056016", Mailed Date: Mar. 26, 2014, Filed Date: Dec. 16, 2005, 4 Pages. (W/O English Translation).

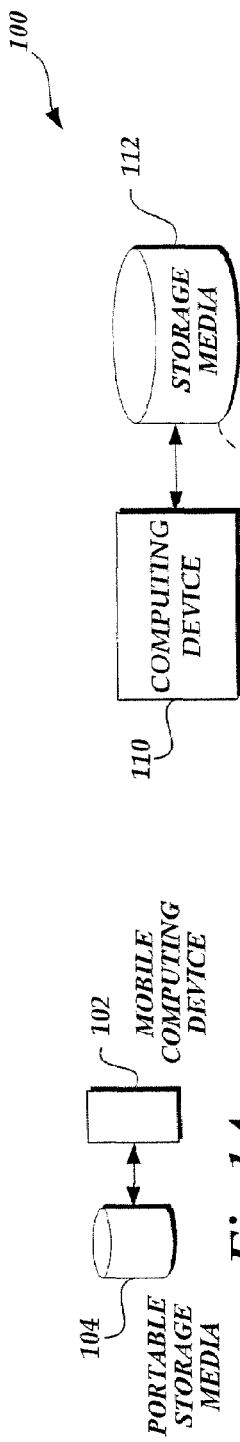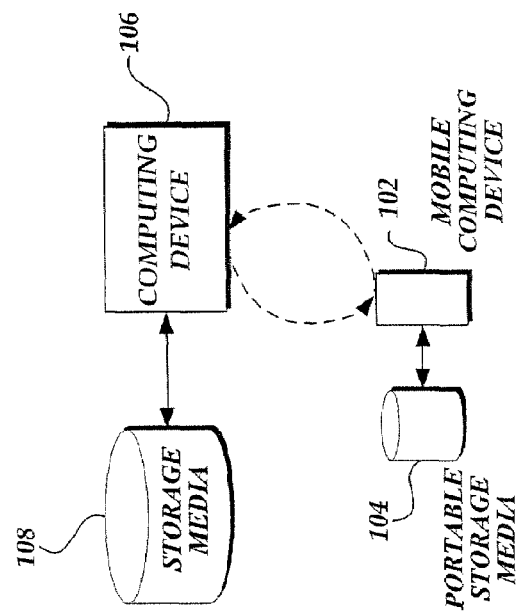

Fig.4.

| NAME | SIZE |
|---|---|
| OEM NAME | 3 |
| DATA SIZE DESCRIPTORS | X |
| ACTIVE FAT | 2 |
| VOLUME SERIAL NUMBER | 4 |
| FILE SYSTEM TYPE | X |

| NAME | SIZE |
|---|---|
| IN USE | 1:1 |
| TYPE | 1:7 |
| SECONDARY ENTRIES | 1 |
| ATTRIBUTES | 2 |
| TIME | X |
| TIME ZONE | 1 |

| NAME | SIZE |
|---|---|
| IN USE | 1:1 |
| TYPE | 1:7 |
| CHARACTERS | 1 |
| NAME HASH | 2 |
| FILE NAME | 28 |

| NAME | SIZE |
|---|---|
| IN USE | 1:1 |
| TYPE | 1:7 |
| SECONDARY ENTRIES | 1 |
| GUID | 16 |

700, 702, 704, 706, 708

| NAME | SIZE |
|---|---|
| IN USE | 1:1 |
| TYPE | 1:7 |
| ACL INFORMATION | X |

*Fig.10.*

| NAME | SIZE |
|---|---|
| IN USE | 1:1 |
| TYPE | 1:7 |
| SECONDARY ENTRIES | 1 |
| GUID | 16 |
| OTHER | X |

*Fig.8.*

| NAME | SIZE |
|---|---|
| IN USE | 1:1 |
| TYPE | 1:7 |
| SECONDARY | 16 |
| GUID | 16 |
| OTHER | X |

*Fig.9.*

EXTENSIBLE FILE SYSTEM

CROSS-REFERENCES TO RELATED APPLICATIONS

This application is a divisional of application Ser. No. 11/229,485, entitled EXTENSIBLE FILE SYSTEM, and filed on Sep. 16, 2005, which in turn claims the benefit of Provisional Application No. 60/637,407, entitled FILE SYSTEM FORMAT FOR PORTABLE MEDIA, and filed on Dec. 17, 2004.

BACKGROUND

Generally described, there are a number of portable computing devices, such as digital still cameras, digital video cameras, media players, mobile phones, mobile computing devices, personal digital assistants, and the like that maintain data on a storage media, such as a portable storage media. The continued development of more complex portable computing devices and larger storage capacity portable storage media places a greater demand for flexibility on the file system format used on the storage media. Current file system format approaches can become deficient in that they may provide adequate flexibility for increasing storage size capacities and/or storage media applications.

SUMMARY

An extensible file system format for portable storage media is provided. The extensible file system format includes the specification of primary and secondary directory entry types that may be custom defined. The primary and secondary directory entry types can be further classified as critical and benign directory entries.

In accordance with an aspect of the present invention, a computer-readable medium having computer-executable components for storing data is provided. The computer-readable components can include a boot parameters component for specifying boot parameters for a file system. The computer-readable components also include a file allocation table component for defining a file allocation table associated with the file system. Additionally, the computer-readable components include a primary directory entry component for specifying data in a root directory of the file system. Still further, the computer-readable components include at least one secondary entry component corresponding to the primary directory entry component. The secondary entry component defines defining meta data associated with the primary directory entry component. The primary and secondary directory entry components can be further classified as critical or benign.

In accordance with another aspect of the present invention, a computer-readable medium having computer-executable components for storing data is provided. The computer-readable components include a boot parameters component for specifying boot parameters for a file system. The computer-readable components also include a file allocation table component for defining a file allocation table associated with the file system. Still further, the computer-readable components include a root directory component for specifying data in a root directory of the file system. Additionally, the computer-readable components include at least extensible one meta data component corresponding to the root directory entry component. The meta data component defines meta data associated with the root directory component.

In an illustrative embodiment, a file system will not mount a volume for a critical primary or root directory entry that is not recognized. The file system can ignore benign primary directory entries, critical secondary directory entries and benign secondary directory entries that are not recognized.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 1A-1C are block diagrams illustrative of an illustrative environment including a portable computing device and a storage device implementing the extensible file system format in accordance with an aspect of the present invention;

FIG. 4 is a block diagram illustrative of data components for implementing a boot process block in an extensible file system format in accordance with an aspect of the present invention;

FIG. 5 is a block diagram illustrative of data components for implementing directory entries in an extensible file system format in accordance with an aspect of the present invention FIG. 6 is a block diagram illustrative of data components for implementing a file name and extensions in an extensible file system format in accordance with an aspect of the present invention;

FIG. 7 is a block diagram illustrative of data components for implementing a volume identifier in an extensible file system format in accordance with an aspect of the present invention;

FIG. 8 is a block diagram illustrative of data components for implementing an extensible directory entry in an extensible file system format in accordance with an aspect of the present invention;

FIG. 9 is a block diagram illustrative of data components for implementing an extensible directory entry in an extensible file system format in accordance with an aspect of the present invention;

FIG. 10 is a block diagram illustrative of data components for implementing an access control list in an extensible file system format in accordance with an aspect of the present invention.

DETAILED DESCRIPTION

Figure 2:
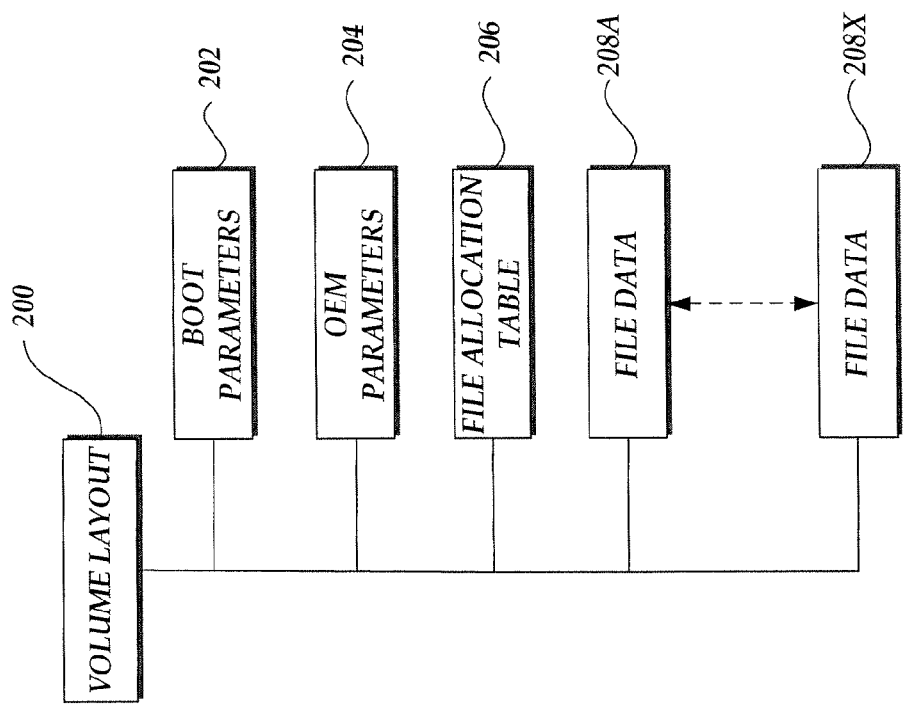
FIG. 2 is a block diagram illustrative of various volume layout components corresponding to an extensible file system format in accordance with an aspect of the present invention.

Generally described, the present invention relates to an extensible file system format and various processes associated with the extensible file system format. In an illustrative embodiment, the extensible file system format corresponds to an extensible file system format for portable storage media and various processes associated with the extensible file system format on the portable storage media. Although the present invention will be described with regard to a portable storage media file system format, one skilled in the relevant art will appreciate that the disclosed embodiments are illustrative in nature and should not be construed as limiting. Additionally, one skilled in the relevant art will appreciate that the data structures and data layouts used in the illustrative examples may require additional information related to performance, security, and the like.

FIGS. 1A-1C are block diagrams illustrative of various operating environments 100 for the extensible file system format of the present invention. With reference to FIG. 1A, in an illustrative embodiment, the extensible file system format is utilized to store data from a computing device, such as a mobile computing device 102, and a storage media, such as a portable storage media 104. In an illustrative embodiment, the mobile computing device 102 can correspond to any one of a variety of computing devices, including but not limited to, portable computing devices, mobile telephones, personal digital assistants, music players, media players. The portable storage media can also include, but is not limited to, hard drives, flash media, micro-drives and other storage media. In an illustrative embodiment, the extensible file system on the portable storage media 104 does not have to include any type of executable or readable software components, such as an operating environment, utilized by the mobile computing device 102. Alternatively, the extensible file system on the portable storage media 104 may include executable or readable software components used by the mobile device 102.

In an illustrative embodiment, the mobile computing device 102 may be in communication with other computing devices for collecting/exchanging data to be stored on the portable storage media 104. With reference to FIG. 1B, the mobile computing device 102 may be in direct communication with another computing device 106 and storage media 108. In an illustrative embodiment, the direct communication can correspond to various wired and wireless communication methods. In an illustrative embodiment, the other storage media 108 is not required to be formatted in accordance with the extensible file system format of the present invention. With reference to FIG. 1C, in a similar manner, the mobile computing device 102 may also be in communication with another computing device 110 and storage media 112, via a network connection. In an illustrative embodiment, the network connection can correspond to local area network (LAN) and wide are network (WAN) connections.

With reference now to FIG. 2, an illustrative embodiment volume layout 200 for an extensible file system format will be described. The volume layout 200 includes a boot parameters component 202 that include various information related to a description of the file system parameters of the partition. In an illustrative embodiment, the boot parameters component 202 can include code for bootstrapping from a defined partition, fundamental file system parameters for the defined partition, and various error checking information. A data structure for defining at least a portion of the boot parameters will be described below with regard to FIG. 4.

The volume layout 200 also includes an extensible parameters component, designated as OEM parameters 204, that define various additional data structures used in conjunction with the file system. In an illustrative embodiment, an original equipment manufacture (OEM) may specify various extensible data structures, such as performance parameters for a storage medium, that can be defined at time of manufacture. The volume layout 200 can further include a file allocation table component 206 that defines file and directory allocations. In an illustrative embodiment, each entry in the file allocation table component 206 corresponds to a 32-bit entry that represents an allocated cluster, an unallocated cluster or an unusable cluster. The volume layout 200 can still further include series of file data components 208A-208X that correspond to the data stored according to the file system format. Various data structures for defining a portion of the file data components 208A-208X will be defined with regard to FIGS. 3-10.

Figure 3:
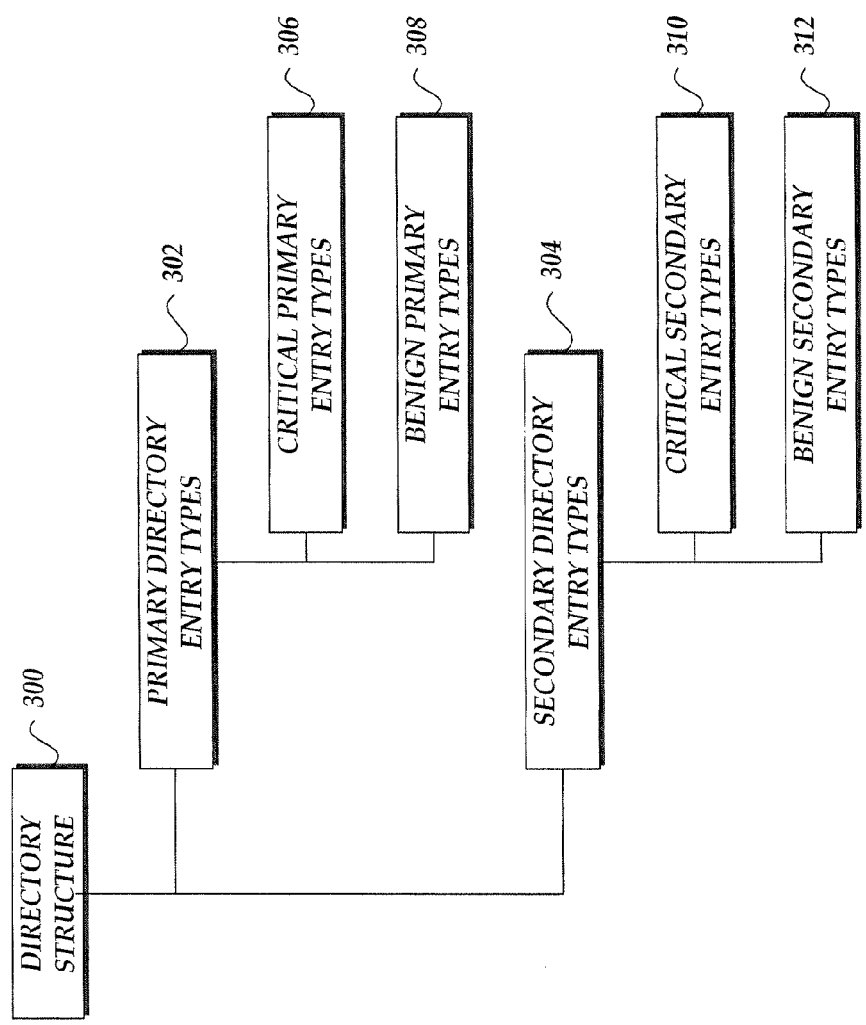
FIG. 3 is a block diagram illustrative of an extensible file system directory structures including primary and secondary directory entry structures in accordance with an aspect of the present invention.

Turning now to FIG. 3, in one aspect, the file data components 208 may include one or more directory entries according to a directory structure 300. In an illustrative embodiment, directory structure 300 is organized into primary directory entries 302 and secondary directory entries 304. Each directory entry in the primary and secondary entries is typed. For example, in an illustrative embodiment, type values for the primary and secondary directory entries can correspond to a range of 1-255. Primary directory entries 302 correspond to the entries in the root directory of the file system. Secondary directory entries 304 follow a primary directory entry and are associated with the primary directory entry. Secondary directory entries extend the metadata associated with the correlated primary directory entry.

With continued reference to FIG. 3, in an illustrative embodiment, the primary directory entries 302 can be further classified as critical primary directory entries 306 and benign primary directory entries 308. Critical primary directory entries 306 define potentially different formats for each directory entry. In an illustrative embodiment, an operating environment will not mount a volume corresponding to the extensible file system format with an unknown critical primary directory entry, as will be described below. Examples of known primary directory entries 306 can include allocation bitmaps, up-case tables, volume labels, encryption keys, and normal directory entries. Benign primary directory entries 308 also define potential different formats for each directory entry, but can be ignored by the file system if a particular benign primary directory entry is not understood. Benign primary directory entries 308 can be associated with another cluster chain the volume. Additionally, benign primary directory entries 308 can also be associated a number of secondary directory entries 304.

In a manner similar to primary directory entries 302, secondary directory entries 304 may also be further classified as critical secondary directory entries 310 and benign secondary directory entries 312. As described above, the critical secondary directory entries 310 and benign secondary directory entries 312 are associated with a benign primary directory entry and extend the metadata associated with the primary directory entry. Both the critical secondary directory entries 310 and the benign secondary directory entries 312 can be associated with another cluster chain the volume.

To mount a corresponding to the extensible file system format, the file system implements a mount volume procedure. In an illustrative embodiment, the mount volume procedure attempts to a look at a version number for the volume. If the version number is not understood (e.g., the version number is higher), the volume will not be mounted. During a normal directory enumeration, any critical primary directory entries not known by the file system will prevent the volume from being mounted. Thereafter, various userinitiated processes, such as a file open, will cause the file system to enumerate the secondary directory entries. If the critical secondary directory entries 310 are not known by a file system, the entire directory entry will be skipped. Additionally, if benign secondary directory entries 312 are not known by the file system, the particular unknown benign secondary directory entry will be ignored.

With reference now to FIG. 4, a block diagram illustrative of data components 400 for implementing a boot process block in the boot parameters component 202 (FIG. 2) will be described. The data components 400 include an OEM name component 402 for specifying a name for the file system format of the storage media. The data components 400 also include a data size descriptor component 404 for specifying various characteristics of the data stored in the file system. For example, the data size descriptor component 404 can specify a count of bytes per sector, a number of sectors per allocation unit, a FAT table offset, and a count of sectors for all data structures. The data components include an active FAT flags component 406 for specifying a number of active FATs on the file system. In an illustrative embodiment, a file system may support multiple FATs for utilization with some operating system environments. The data components 400 can further include a volume identification component 408 for identifying a volume serial number and/or version number. Still further, the data components 400 can include a file system type for specifying the file system format for the file system. One skilled in the relevant art will appreciate that the data components 400 can include a number of additional/alternative rows for implementing the above-identified components 402-410 and additional components.

Turning now to FIG. 5, a block diagram illustrative of data components 500 for implementing directory entries in an extensible file system format will be described. The data components 500 include an in use component 502 for specifying whether the particular directory entry is in use. In an illustrative embodiment, the high bit of the data components will be set to "1" if the directory entry is in use. The data components 500 further include a type designation component 504 for specifying that the directory entry is associated with a normal directory entry. The data components 500 further include a secondary directory entries component 504 for specifying a number of secondary entries associated with the normal directory entry. The data components 500 also include a file attributes component 508 for specifying various file system attributes for the directory entry. Still further, the data components 500 include a time component 510 for specifying various time information such as a creation timestamp, modification time stamp and other time information. Additionally, the data components 500 further include a time zone component 512 for specifying a time zone for the last created time stamp. One skilled in the relevant art will appreciate that the data components 500 can include a number of additional/alternative rows for implementing the above-identified components 502-512 and additional components.

Turning now to FIG. 6, a block diagram data components 600 for implementing a file name and extensions will be described. The data components 600 include an in use component 602 for specifying whether the particular directory entry is in use. In an illustrative embodiment, the high bit of the data components will be set to "1" if the directory entry is in use. The data components 600 further include a type designation component 604 for specifying that the directory entry is associated with a file system name. The data components further include a file name length component 606 and a file name has component 608. The utilization of the file name hash component 608 will be described below. The data components 600 also include a file name component 610 for specifying the file name. One skilled in the relevant art will appreciate that the data components 600 can include a number of additional/alternative rows for implementing the above-identified components 602-610 and additional components. Additionally, file name directory entries may be extended by secondary directory entries.

Turning now to FIG. 7, a block diagram illustrative of data components 700 for implementing a volume identifier in an extensible file system format is provided. The data components 700 include an in use component 702 for specifying whether the particular directory entry is in use. In an illustrative embodiment, the high bit of the data components will be set to "1" if the directory entry is in use. The data components 700 further include a type designation component 704 for specifying that the directory entry is associated with a volume identifier. The data components 700 further include a secondary directory entries component 706 for specifying a number of secondary entries associated with the volume identifier. The data components 700 also include a volume identifier 708, such as a global unique identifier. One skilled in the relevant art will appreciate that the data components 700 can include a number of additional/alternative rows for implementing the above-identified components 702-708 and additional components. Additionally, in an illustrative embodiment, the data components 700 correspond to a benign directory entry that can be ignored by a file system that does not support volume identifiers.

With reference now to FIGS. 8 and 9, in an illustrative embodiment, parties, such as an OEM, may be able to define specific benign primary directory entry types 308 and benign secondary directory entry types 312. As discussed above, in the event the file system would not recognize or understand either the specific benign primary directory entry types 308 or benign secondary directory entry types 312, the file system could ignore the defined directory entry types.

With reference to FIG. 8, a block diagram illustrative of data components 800 for implementing an extensible benign primary directory entry 308 in an extensible file system format will be described. The data components 800 include an in use component 802 for specifying whether the particular directory entry is in use. In an illustrative embodiment, the high bit of the data components will be set to "1" if the directory entry is in use. The data components 800 further include a type designation component 804 for specifying that the directory entry is a benign primary directory entry. The data components 800 further include a secondary directory entries component 806 for specifying a number of secondary entries associated with the volume identifier. The data components 800 also include a volume identifier 808, such as a global unique identifier. The data components 800 can further include additional information 810, such as verification information and a starting cluster. One skilled in the relevant art will appreciate that the data components 800 can include a number of additional/alternative rows for implementing the above-identified components 802-506 and additional components.

With reference to FIG. 9, a block diagram illustrative of data components 900 for implementing a benign secondary directory entry in an extensible file system format will be described. The data components 900 include an in use component 902 for specifying whether the particular directory entry is in use. In an illustrative embodiment, the high bit of the data components will be set to "1" if the directory entry is in use. The data components 900 further include a type designation component 904 for specifying that the directory entry is a benign primary directory entry. The data components 900 further include a secondary directory entries component 906 for specifying a number of secondary entries associated with the volume identifier. The data components 900 also include a volume identifier 908, such as a global unique identifier. The data components 900 can further include additional information 910, such as verification information and a starting cluster. One skilled in the relevant art will appreciate that the data components 900 can include a number of additional/alternative rows for implementing the above-identified components 902-906 and additional components.

In an illustrative embodiment, a benign primary directory entry and/or secondary directory entries may be associated with access control list (ACL) information. FIG. 10 is a block diagram illustrative of data components 1000 for implementing an access control list in an extensible file system format. The data components 1000 include an in use component 1002 for specifying whether the particular directory entry is in use. In an illustrative embodiment, the high bit of the data components will be set to "1" if the directory entry is in use. The data components 1000 further include a type designation component 1004 for specifying that the directory entry is an ACL directory entry. The data components 1000 further include a number of ACL fields 1006, such as ACL flags, pointers to ACL databases, and the like. One skilled in the relevant art will appreciate that the data components 1000 can include a number of additional/alternative rows for implementing the above-identified components 1002-1006 and additional components.

Figure 11:
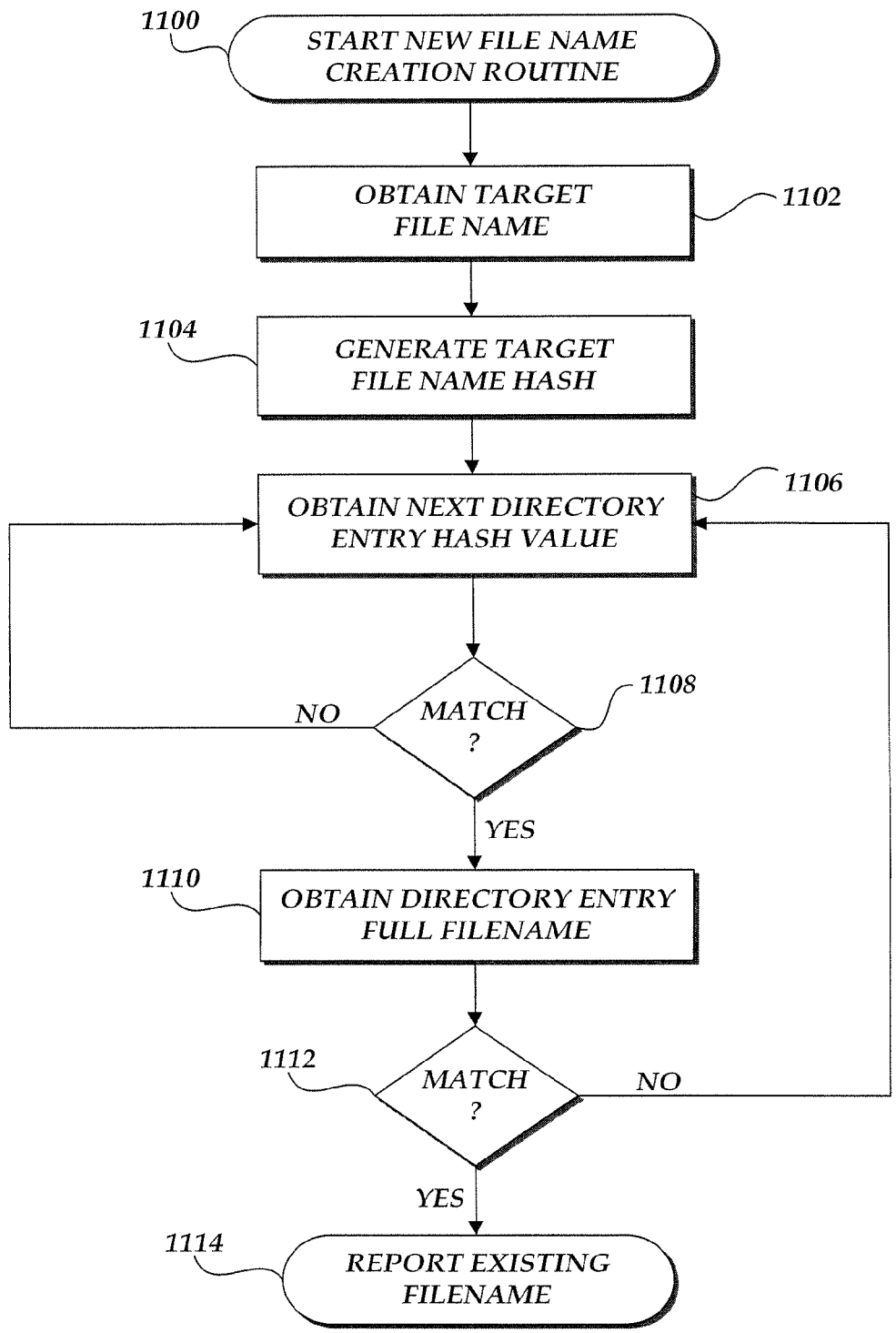
FIG. 11 is a flow diagram illustrative of a file name creation routine for an extensible file system format in accordance with an aspect of the present invention.

With reference now to FIG. 11, a file name creation routine 1100 for an extensible file system format will be described. At block 1102, a file system obtains a request to create a directory entry with a specific file name. In an illustrative embodiment, the specific file name can correspond to a naming convention, such as a digital camera picture naming convention. At block 1104, the file system generates a target name hash. At block 1106, an iterative loop is begun by examining the next directory entry hash value. An illustrative directory entry type for storing directory entry hash values is described above with regard to data components 600 (FIG. 6).

At decision block 1108, a test is conducted to determine whether the target hash value matches the current directory entry hash value. If they do not match, the routine 1100 returns to block 1106 (until all the directory entries have been examined. If the hash values match at decision block 1108, at block 1110, the file system obtains the full file name for the potentially matching directory entry. An illustrative directory entry type for storing directory entry full file names is described above with regard to data components 600 (FIG. 6). At decision block 1112, a test is conducted to determine whether the target file name matches the full file name of the potentially matching directory entry. If so, the routine 1100 terminates by reporting a conflict and the file system will be required to select a new file name. If the full file does not match, the routine 1100 will return to block 1106 to continue checking hash values for all the directory entries in the file system.

In accordance with an aspect of the present invention, various additional functionality may be added through the specification of specific directory types. For example, name streams may be supported by specifying a name stream directory entry. Additionally, on-disk encryption may also be supported through the utilization of specific encryption algorithms and key exchanges. Still further, time zone conversions may be associated with directory entries to automatically convert a current time zone with a time zone with the directory entry was made.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computing device comprising a file system and a computer readable storage medium that stores information within a volume on the computer readable storage medium, comprising:
   the volume, the volume comprising:
   a boot parameters component of the volume that specifies boot parameters for use by the file system;
   a file allocation table component comprising a file allocation table associated with the file system; and
   a plurality of directory entries containing data for use by the file system, each of the plurality of directory entries containing information designating the directory entry as either a primary directory entry or a secondary directory entry, each primary directory entry further containing information designating that primary directory entry as either a critical primary directory entry or a benign primary directory entry, each of the primary and secondary directory entries being typed and including a type designation that identifies the type of the directory entry and wherein at least some of the types of primary and secondary directory entries are customdefinable,
   the file system, when enumerating directory entries during a process of mounting the volume, preventing the volume from being mounted when the file system does not recognize the type of a critical primary directory entry; and
   the file system, after the volume has been mounted, ignoring a benign primary directory entry when the file system does not recognize the type of the benign primary directory entry.

2. The computing device recited in claim 1, each secondary directory entry being associated with a primary directory entry and defining metadata associated with the associated primary directory entry, and each secondary directory entry further containing information designating that secondary directory entry as either a critical secondary directory entry or a benign secondary directory entry.

3. The computing device recited in claim 1 further comprising an extensible parameters component of the volume that specifies one or more original equipment manufacturer parameters.

4. The computing device recited in claim 3, wherein the one or more original equipment manufacturer parameters include performance parameters for a particular computer readable medium.

5. The computing device recited in claim 1, wherein the boot parameters component includes an identification of an original equipment manufacturer name, one or more data size descriptors, a specification of a number of active file allocation table components, a volume serial number, or a file system format identification.

6. The computing device recited in claim 5, wherein the one or more data size descriptors include a count of bytes per sector, a number of sectors per allocation unit, a file allocation table component offset, or a count of sectors for all data structures.

7. The computing device recited in claim 1, wherein the primary directory entries are selected from a group consisting of allocation bitmap directory entries, up case table directory entries, volume label directory entries, encryption directory entries and normal directory entries.

8. The computing device recited in claim 7, wherein the normal directory entries include an in use flag, a directory entry type identifier, an identification of a number of secondary entries, an identification of a number of file attribute characteristics, or an identification of a time characteristics.

9. The computing device recited in claim 8, wherein at least one of the normal directory entries corresponds to at least one file name and extension directory entry including an in use flag, a directory entry type identifier, a file name length identifier, a file name specification, or a file name identifier.

10. The computing device recited in claim 9, wherein the file name identifier is a hash of the file name specification.

11. The computing device recited in claim 7, wherein at least one of the normal directory entries corresponds to at least one volume identifier directory entry including an in use flag, a directory type identifier, an identification of a number of secondary entries, or a global unique identifier for the volume.

12. The computing device recited in claim 8, wherein at least one of the normal directory entries corresponds to at least one access control directory entry including an in use flag, a directory type identifier, and access control list information.

13. A computing device comprising a file system and a computer readable storage medium that stores information within a volume on the computer readable storage medium, comprising:
  the volume, the volume comprising:
    a boot parameters component of the volume that specifies boot parameters for use by the file system;
    a file allocation table component comprising a file allocation table associated with the file system; and
    a plurality of directory entries containing data for use by the file system, each of the plurality of directory entries containing information designating the directory entry as either a primary directory entry or a secondary directory entry, each secondary directory entry being associated with a primary directory entry and defining metadata associated with the associated primary directory entry, and each secondary directory entry further containing information designating that secondary directory entry as either a critical secondary directory entry or a benign secondary directory entry, each of the primary and secondary directory entries being typed and including a type designation that identifies the type of the directory entry and wherein at least some of the types of primary and secondary directory entries are custom-definable;
  the file system, after the volume has been mounted, ignoring a critical secondary directory entry and the primary directory entry with which it is associated when the file system does not recognize the type of the critical secondary directory entry; and
  the file system, after the volume has been mounted, ignoring a benign secondary directory entry when the file system does not recognize the type of the benign secondary directory entry.

14. The computing device recited in claim 13, each primary directory entry further containing information designating that primary directory entry as either a critical primary directory entry or a benign primary directory entry.

15. The computing device recited in claim 13, wherein the primary directory entries are selected from a group consisting of allocation bitmap directory entries, up case table directory entries, volume label directory entries, encryption directory entries and normal directory entries.

* * * * *